Feb. 26, 1957          J. ROSAN          2,782,883

REPLACEABLE INSERT

Filed May 2, 1952

INVENTOR.
JOSEPH ROSAN
BY
Lyon & Lyon
ATTORNEYS

United States Patent Office 2,782,883
Patented Feb. 26, 1957

2,782,883

REPLACEABLE INSERT

Joseph Rosan, Balboa Island, Calif.

Application May 2, 1952, Serial No. 285,739

4 Claims. (Cl. 189—34)

My invention relates to replaceable inserts, the present application being a continuing application of my prior application for Replaceable Insert, Serial No. 601,454, filed June 25, 1945, and now abandoned.

Among the objects of my invention are:

First, to provide a replaceable threaded insert which is adapted to be molded or cast in a body of material, and in the event of subsequent damage, may be replaced by a replacement insert of the type disclosed in the copending application, Serial No. 466,855, now Patent No. 2,400,318.

Second, to provide a replaceable insert having a threaded shank, a flanged circularly smooth head and annular non-helical locking channels to prevent unscrewing of the screw threads, the entire insert being so constructed that it functions as a core to cast in a body of material a socket capable of receiving my above mentioned replacement insert. More specifically, the flanged head of my replaceable insert may define a smooth counterbore of such diameter that the serrations of the replacement locking ring may broach into the walls of the counterbore.

Third, to provide a replaceable insert which is particularly economical of manufacture, easily molded in place, and which will not accidentally work loose.

With the above and other objects in view as may appear hereinafter, reference is directed to the accompanying drawings, in which.

Figure 1:
Figure 1 is a plan view of one form of my replaceable insert wherein a threaded bore and an annular counterbore is formed when the insert is cast in a body of material.
Figure 2:
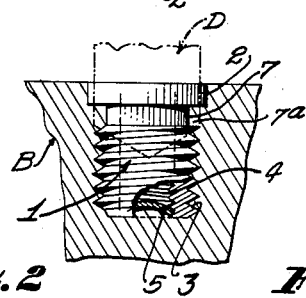
Figure 2 is a partial sectional, partial elevational view of my insert shown cast in a body of material, and indicating by broken lines a drill and the dimensions and depth to which the insert is drilled in order to effect its removal.
Figure 3:
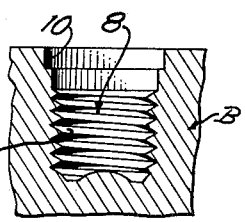
Figure 3 is a sectional view similar to Figure 2 showing the socket formed in a body of material on removal of my insert.

Reference is first directed to Figures 1, 2 and 3. In this form of my single-piece replaceable insert, the insert includes a shank or subcylindrical axially inner section 1 and an axially outer section comprising a head or flange 2 at one end. The head 2 has a smooth outer periphery and smooth undersurface. As shown in Figures 1 and 2, the shank 1 is tubular and provided with external threads 3 and internal threads 4. The external threads 3 are preferably coarser than the internal threads 4. The bore of the shank 1 may be closed by a seal cap 5 in the form of a disc pressed into the end thereof. The inner end of the shank 1 is circumferentially substantially smooth, i. e., free from protuberances which would prevent rotation during a removal operation.

Figure 8:
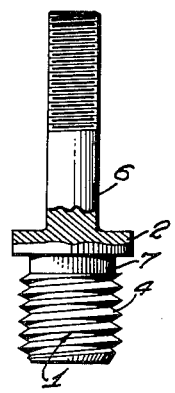
Figure 8 is an elevational view of the form of insert shown in Figure 2, illustrating that any of the modifications shown may be equipped with an integral stud in lieu of internal threads for fastening the body to an object.

The shank 1 need not be tubular, however, but may be solid and provided with an integral stud 6 extending from its upper end, as shown in Figure 8.

The external threads 3 terminate short of the flange or locking head 2, whereby a neck of reduced diameter is provided and a locking channel 7 is formed. Such channel also facilitates the external threading operation of the shank 1 when certain types of threading tools are employed. The head 2 may be said to have a major diameter, since it is larger in diameter than the screw threads 3, and the cylindrical portion of the insert at the channel 7 may be said to have a minor diameter since it is slightly smaller in diameter than the root of the threads 3.

Figure 4:
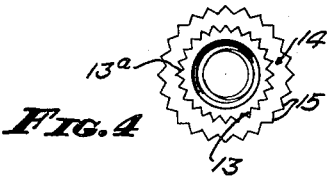
Figure 4 is a plan view of my replacement insert, hereinafter referred to as a two-piece insert, distinguished from my single-piece replaceable insert, this view illustrating the type of insert disclosed in my aforementioned copending applications.
Figure 5:
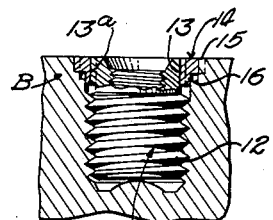
Figure 5 is a partial sectional, partial elevational view of my two-piece insert shown secured in the socket prepared by my single-piece insert.

The single-piece or replaceable insert is adapted to be molded in a body of material B with its outer end surface substantially flush with the outer surface of said body. Thus, for example, the insert may be formed of steel or other comparatively hard material and molded in a body of softer material such as aluminum, various die casting alloys, plastics, suitable vulcanizable rubber compositions, or the like. Such material, of course, must not be such that it welds or fuses to the surface of the insert. However, if this be the case, the shank may be covered with a protector as shown in my Patent No. 2,545,045, issued March 13, 1951. It will thus be seen that the insert functions as a core for casting in the body of material a socket 8 comprising a threaded portion 9 and counterbore 10 as shown in Figure 3. The dimensions of such socket may be identical or approximately identical to the external dimensions of my two-piece or replacement insert disclosed more fully in my copending applications. To facilitate and explain the use and function of my single-piece insert, my two-piece insert is illustrated in Figures 4 and 5.

The two-piece insert comprises a shank 11 which may be tubular and internally threaded or solid and provided with a stud, as in the case of the single-piece insert. The shank 11 is provided with external threads 12 corresponding to the external threads 3. The upper portion of the shank 11 is provided with longitudinally extending serrations 13 preferably within the annulus defined by the root and outside diameters of the external threads 12.

A locking ring 14 fits over the upper end of the shank 11. The locking ring 14 is provided with internal serrations 13a, which mate with the serrations 13, and with external serrations 15 which broach into the walls at the counterbore 10 cast by the head 2 of the single-piece or replaceable insert. The underside of the locking ring 14 is preferably rabbeted or provided with a pilot portion 16 of reduced diameter substantially equal to the diameter of the drill D (Figure 2), so that the internal serrations 13a of the ring are slightly longer than the external serrations 15.

Figure 9:
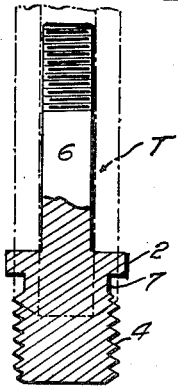
Figure 9 is a sectional view of my insert equipped with an integral stud as shown in Figure 8 and illustrating the manner in which a tubular drill or severing tool is employed to separate the head and shank, the severing tool being indicated by broken lines.

The single-piece insert when molded or cast within a body of material, is initially locked against removal by reason of the channel 7 and the corresponding internal flange 7a of material in which the insert is cast. Should the insert be damaged in a manner to require its removal, it is merely necessary to drill into the shank 1 by the drill D to the depth indicated by broken lines in Figure 2, that is, into intersection with the uppermost of the external threads 3, and at a diameter approximating, but not less than the outside diameter of said threads 3. When this is done the internal flange 7a is destroyed and it is a simple matter to force a tool into the lower threaded end of the shank 1 and unscrew it. The annular extended portion of the head 2 can be readily removed by prying. It will be noted that the diameter of the drill required to separate the flange and shank for piecemeal removal, is smaller than the diameter of the flange. As a consequence, the drill does not initially overlap or cut into the softer material in which the insert is molded but is entirely guided by the internally threaded socket within the insert. If the insert is equipped with a stud 6, a tubular drill T (as shown by broken lines in Figure 9) is used, such tubular drill being guided by the stud 6. As a consequence, a concentric hole may be easily drilled even when this operation must be performed "in the field" or under conditions in which hand tools or imperfect tools are available. This is important for the reason that in order to employ the two-piece insert, shown in Figures 4 and 5, it is highly desirable that the counterbore have the correct diameter and be concentric with respect to the threaded socket cast by the shank 1. With ordinary care, it is virtually impossible to damage the body of material in which the single-piece insert is cast in the course of removing the insert and replacing it with my two-piece insert.

Figure 6:
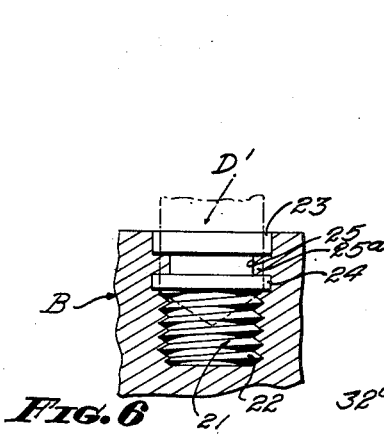
Figure 6 is an elevational view of a further modified form of my single-piece replaceable insert, shown cast in a body of material and also indicating by broken lines the depth and position of a drill employed to prepare the insert for removal.

If it is desired to have a locking channel deeper than the annulus between the root and outside diameters of the external threads 3 or 12, or to provide a larger shear area, a circumferentially ribbed construction, such as shown in Figure 6, may be employed. Here a shank 21 is provided, having external threads 22, as in the other described structures. The upper portion of the shank is provided with an outer flange 23 corresponding to the head or flange 2 and an inner flange 24. Between the two flanges is formed a locking channel 25. The locking channel forms in the surrounding body of material an internal flange 25a. The diameter of the interlocking channel and internal flange is shown as less than the root diameter of the threads 22, but may be only slightly less than the maximum diameter of the external threads 22 so that when a drill D having the diameter of the external threads 22 is drilled into the insert, the interlocking material is entirely removed.

The insert shown in Figure 6 is replaced in the same manner as the previously described inserts, that is, the shank is drilled out until the external threads are intersected, the remaining portion of the shank is unscrewed, and the outer flange 23 pried from the counterbore which it has formed. In this case, the inner flange 24 is left in place as it clears the parts of the two-piece replacement insert.

Figure 7:
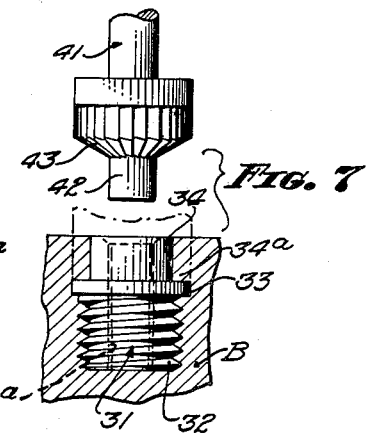
Figure 7 is another elevational view of a further modified form of my replaceable insert shown cast in a body of material and illustrating a special pilot guided tool employed to effect its removal.

In some instances, it is possible to omit the outer flange 23 of the construction shown in Figure 6, with the result shown in Figure 7. In this case, the shank 31 is provided with external threads 32 at the upper extremity of which is a flange 33. Above the flange 33, the shank 31 forms a reduced portion 34. The advantage of this construction lies in the fact that the material 34a molded into the reduced portion 34 may have a greater axial extent than is possible in the construction shown in Figures 2 and 6, and consequently, offers greater resistance to any force tending to unscrew the insert.

This construction requires, however, that a special tool be employed to remove the insert, namely, a drill 41 having a pilot portion 42 adapted to fit rather closely in the threaded bore 32a of the shank, and a mill portion 43 sufficiently large to form the counterbore for the locking ring 14 of my two-piece insert. This is made necessary for the fact that the material in which the insert is cast is almost invariably softer than the insert so that an ordinary drill, unless properly sharpened and adequately guided, would tend to cut or drill an oversize or eccentric hole that would destroy the counterbore in which it is desired to employ the locking ring of the two-piece insert.

In each of the constructions illustrated, the head is essentially circular in plan, so that the serrated replacement ring may be accommodated irrespective of the orientation of the insert.

While a stud 6 is shown in Figure 8, with the type of insert construction disclosed in Figure 1, it is, of course, obvious that any of the modifications shown may be provided with integral studs instead of internally threaded bores.

In all forms of the replaceable insert disclosed herein, the head and/or flanged portions have a smooth peripheral surface and a smooth undersurface. The flange forming material of the body indicated at 7a, 25a, and 34a interlocks with the embedded inserts shown in Figures 2, 6 and 7, respectively, to restrain the same against axial movement relative to the body, and the external threads 3, 22 and 32 cooperatively function to prevent rotation of the embedded inserts, whereby said inserts are positively restrained against both axial and rotary movement and cannot work loose.

In the various forms of single-piece inserts shown, the internally threaded bores of the shanks, or the externally threaded studs, as the case may be, perform the dual function of guiding the severing tool and affording means for the attachment, or reception of a tool employed to remove the severed threaded portion of the shank.

It will also be understood that the internal threaded bores and externally threaded studs are adapted to reserve suitable fastening elements for securing a body having the present inserts embedded therein to any given object or structure.

Many other embodiments of the invention may be resorted to without departing from the principles of the invention.

I claim:

1. In combination, a body of material and an insert of relatively harder material, said insert comprising: a substantially cylindrical, axially inner section having exterior screw threads on a portion thereof and terminating in a circumferentially substantially smooth inner end; an integral outer section having an enlarged, smooth, annular, circular flange portion of a greater diameter than the outer diameter of said screw threads and a smooth, annular, circular locking-channel portion of less diameter than the root diameter of said screw threads, said insert being molded in said body of material with the outer end of said outer section flush with a surface of said body, and means on said insert for receiving a fastening element for securing said body to an object, said flange and locking-channel portions forming with the surrounding body of material radially interlocking portions preventing axial displacement of said insert relative to said body and said screw threads cooperating with said interlocking portions to prevent rotation of said insert relative to said body, said insert being capable of removal by drilling a hole through said outer section of a diameter at least as large as the outside diameter of said screw threads and of sufficient depth to intersect with said screw-threaded inner section to destroy said radially interlocking portions, whereupon said inner section may be unscrewed from said body of material.

2. The combination as set forth in claim 1, wherein: the locking-channel portion of said outer section is adjacent to said screw-threaded inner section, and said flange portion extends uninterruptedly from said locking-channel portion to the surface of the body of material to form a counterbore extremity in said body of material.

3. The combination as set forth in claim 1, wherein: the outer section includes a second enlarged circular flange portion and the locking-channel portion is disposed between the flange portions, and wherein one of the flange portions forms a counterbore extremity in said body of material.

4. The combination as set forth in claim 1, wherein: said flange portion is adjacent to said screw-threaded inner section and said locking-channel portion extends therefrom to the surface of said body of material.

References Cited in the file of this patent

UNITED STATES PATENTS

| | | |
|---|---|---|
| 1,167,759 | Hopkins | Jan. 11, 1916 |
| 1,868,037 | Weatherhead | July 19, 1932 |
| 1,907,303 | Peterson | May 2, 1933 |
| 1,989,996 | Mautsch | Feb. 5, 1935 |
| 2,452,262 | Rosan | Oct. 26, 1948 |
| 2,607,446 | Rosan | Aug. 19, 1952 |